(12) United States Patent
Kuo et al.

(10) Patent No.: US 8,593,405 B2
(45) Date of Patent: Nov. 26, 2013

(54) ELECTRONIC DEVICE AND METHOD FOR EXECUTING COMMANDS IN THE SAME

(75) Inventors: Yien Chun Kuo, Taoyuan (TW); Yen Lee Chu, Taoyuan (TW)

(73) Assignee: HTC Corporation, Taoyuan (JP)

( * ) Notice: Subject to any disclaimer, the term of this patent is extended or adjusted under 35 U.S.C. 154(b) by 751 days.

(21) Appl. No.: 12/346,422

(22) Filed: Dec. 30, 2008

(65) Prior Publication Data

US 2009/0167693 A1  Jul. 2, 2009

(30) Foreign Application Priority Data

Dec. 31, 2007 (TW) ................................ 96151363 A

(51) Int. Cl.
*G06F 3/02* (2006.01)
(52) U.S. Cl.
USPC .......................................................... 345/168
(58) Field of Classification Search
None
See application file for complete search history.

(56) References Cited

U.S. PATENT DOCUMENTS

| | | | |
|---|---|---|---|
| 4,891,777 A * | 1/1990 | Lapeyre ......................... | 708/130 |
| 6,724,370 B2 | 4/2004 | Dutta et al. | |
| 7,098,896 B2 * | 8/2006 | Kushler et al. ................ | 345/168 |
| 8,102,366 B2 * | 1/2012 | Ennadi ........................... | 345/156 |
| 2003/0006967 A1 * | 1/2003 | Pihlaja .......................... | 345/168 |
| 2004/0140956 A1 * | 7/2004 | Kushler et al. ................ | 345/168 |
| 2004/0155869 A1 * | 8/2004 | Robinson et al. ............. | 345/168 |
| 2006/0026535 A1 | 2/2006 | Hotelling et al. | |
| 2006/0119582 A1 * | 6/2006 | Ng et al. ........................ | 345/168 |
| 2006/0238517 A1 | 10/2006 | King et al. | |
| 2007/0139382 A1 * | 6/2007 | Kotipalli ........................ | 345/168 |
| 2008/0007529 A1 * | 1/2008 | Paun et al. ..................... | 345/168 |
| 2008/0225006 A1 * | 9/2008 | Ennadi .......................... | 345/171 |
| 2009/0140985 A1 * | 6/2009 | Liu ................................ | 345/168 |
| 2009/0167693 A1 * | 7/2009 | Kuo et al. ..................... | 345/168 |

FOREIGN PATENT DOCUMENTS

| | | |
|---|---|---|
| JP | 11194882 | 7/1999 |
| TW | 200403582 | 3/2004 |
| TW | I233041 | 5/2005 |
| TW | 200529058 | 9/2005 |
| TW | 200715171 | 4/2007 |
| TW | 200725371 | 7/2007 |
| WO | 2007099728 | 9/2007 |

* cited by examiner

*Primary Examiner* — Peter Vincent Agustin

(57) ABSTRACT

The present invention provides a method for executing commands in an electronic device, which has a touch sensing element, a keyboard unit and a display. First, the touch sensing element is configured for detecting a touch on one of the keys on the keyboard unit and generating a responsive signal corresponding to the touched key. Afterward, a plurality of items corresponding to the touched key is shown on the display according to the responsive signal. Subsequently, the touch on the key is moved onto another key on the keyboard unit so as to mark one of the items. Finally, a command associated with the marked item is executed when the touch on the key is terminated.

15 Claims, 6 Drawing Sheets

ELECTRONIC DEVICE AND METHOD FOR EXECUTING COMMANDS IN THE SAME

CROSS REFERENCE TO RELATED APPLICATION

This application claims the priority benefit of Taiwan Patent Application Serial Number 096151363 filed Dec. 31, 2007, the full disclosure of which is incorporated herein by reference.

BACKGROUND OF THE INVENTION

1. Field of the Invention

The invention relates to a method for executing commands in an electronic device, and more particularly, to a method for executing commands in an electronic device through a touch keyboard.

2. Description of the Related Art

Today, when a user intends to input texts or commands in a computing device via a keyboard, the user sometimes needs to use composite keys to fulfill it. For example, when a user intends to input a certain uppercase letter, the user is required to know which mode the keyboard operates in. If the keyboard is in lowercase mode, that is, under the condition that the caps-lock indicator on the keyboard turns off, the user has to press the caps-lock key on the keyboard to light up the caps-lock indicator to switch the keyboard to the uppercase mode. Afterward, the user presses the corresponding letter key to input the uppercase letter. Alternatively, the user presses and holds the "Shift" key and then presses the corresponding letter key to input the uppercase letter. Furthermore, when a user intends to input a certain accent key, for example, an "é", the user has to press and hold the "'" key and then press the "e" key.

In addition, some keys on the keyboard can be used to launch specific applications. When one of these keys is pressed, the display will show a menu. However, the user is still required to use a mouse or arrow keys on the keyboard to select a desired item from the menu. For example, when a user presses the "start" key, a corresponding menu will be shown on the display. The user is then required to use a mouse or arrow keys to select a desired item from the menu.

In view of the above, a user is sometimes required to simultaneously press two keys or successively press a plurality of keys in order to input a command. Alternatively, the user uses both the keyboard and mouse for inputting commands. However, the above command input methods are very inconvenient for users.

SUMMARY

It is an object of the present invention to provide a method for executing commands in an electronic device, wherein a command is executed by touching a touch surface and then performing a movement on the touch surface.

According to the method for executing commands in an electronic device of the first embodiment of the present invention, a touch sensing element is used to detect a touch on one of the keys on the keyboard unit and generate a responsive signal corresponding to the touched key. Afterward, a plurality of items corresponding to the touched key is shown on a display according to the responsive signal. Subsequently, the touch on the key is moved onto another key on the keyboard unit so as to mark one of the items. Finally, a command associated with the marked items is executed when the touch on the key is terminated.

According to the method for executing commands in an electronic device of the second embodiment of the present invention, one of a plurality of switched is configured for detecting a press on a corresponding first key on the keyboard unit. Afterward, a plurality of items corresponding to the first key is shown on a display in response to the press. Subsequently, a touch on the first key is detected by a touch sensing element. When the touch on the first key is moved onto a second key on the keyboard unit, one of the items is marked. Finally, a command associated with the marked items is executed when the touch on the second key is terminated.

According to the methods for executing commands in an electronic device, a desired command can be executed by only touching the keyboard unit and then performing a movement on the keyboard unit.

It is another object of the present invention to provide an electronic device capable of implementing the above methods.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
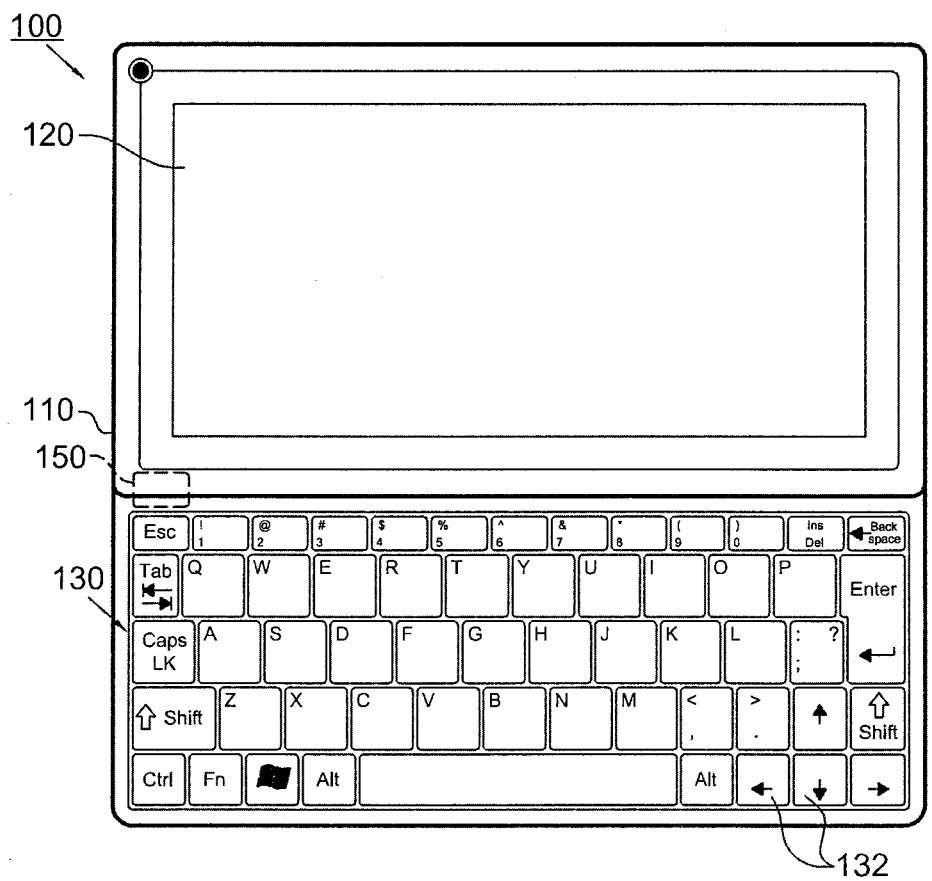
FIG. 1 illustrates the electronic device according to the first embodiment of the present invention.
Figure 2:
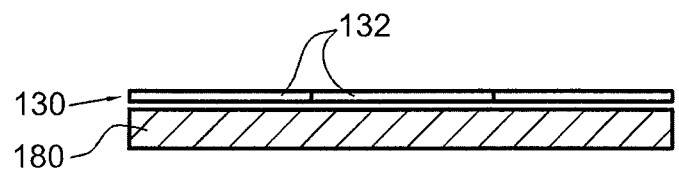
FIG. 2 is a partially cross-sectional view of the electronic device according to the first embodiment of the present invention.

Referring to FIGS. 1 and 2, the electronic device 100 according to the first embodiment of the present invention includes a housing 110, a display 120 disposed on the housing 110, a keyboard unit 130 and a touch sensing element 180. The touch sensing element 180 is disposed under the keyboard unit 130 and the keyboard unit 130 includes a plurality of keys 132 labeled with letters, numbers or symbols. In this embodiment, the keys 132 are integrally formed on a same continuous surface. The keyboard unit 130 is a QWERTY keyboard. Specifically, the arrangement of the keys 132 labeled with English letters is referred to that of the English letter keys on a standard QWERTY keyboard. When a certain key 132 is touched, the touch sensing element 180 below will be activated to send a responsive signal corresponding to the touched key 132. According to the embodiment of the present invention, when a different key 132 is touched, a different responsive signal is sent by the touch sensing element 180.

Figure 3:
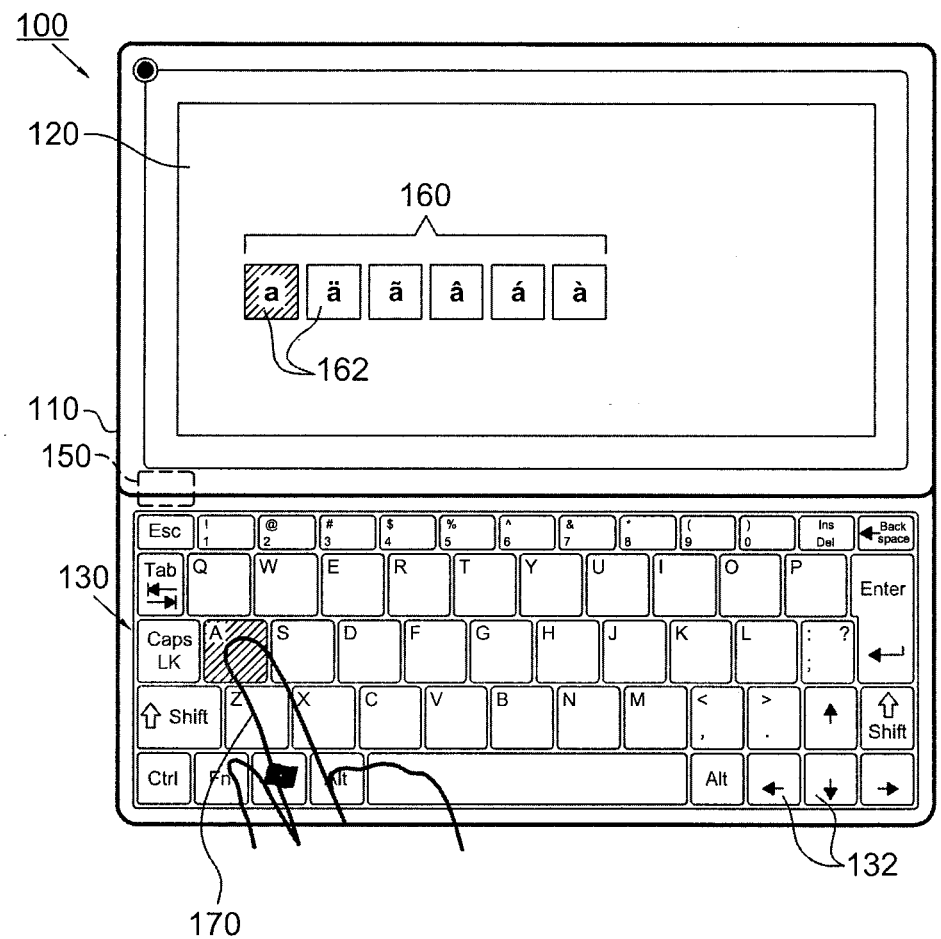
FIG. 3 illustrates the method for executing commands in the electronic device according to the first embodiment of the present invention, wherein a plurality of items is shown on the display in a straight line arrangement.
Figure 4:
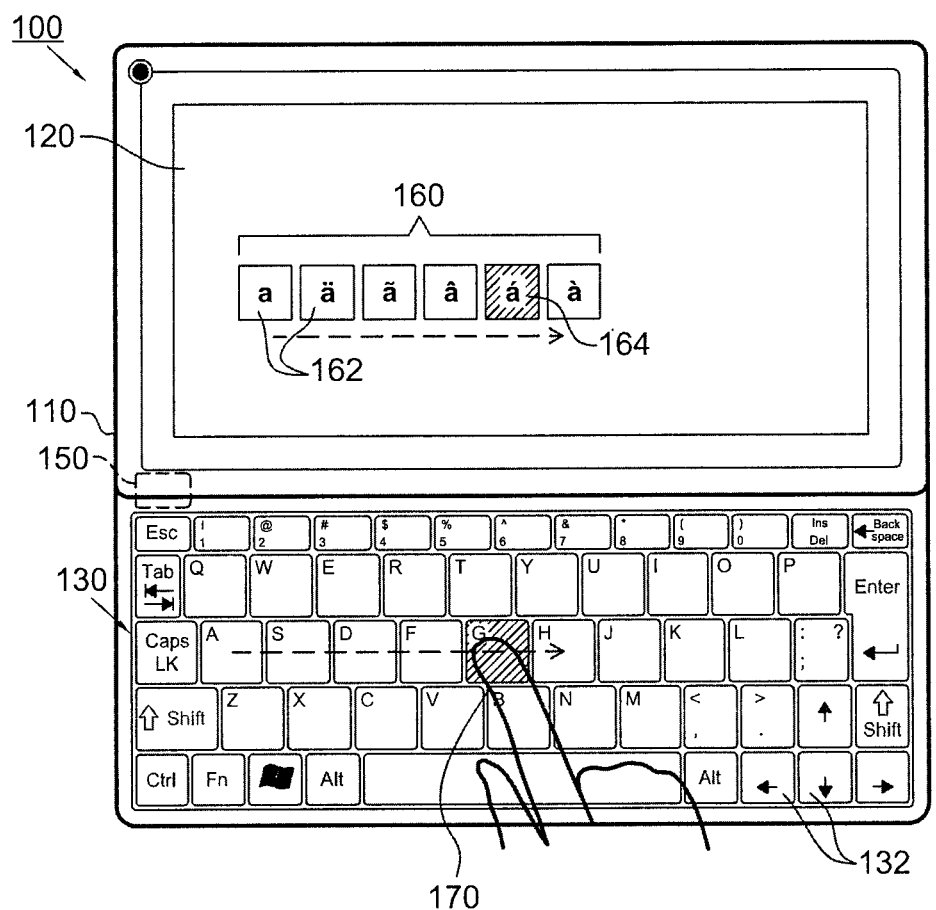
FIG. 4 illustrates the method for executing commands in the electronic device according to the first embodiment of the present invention, wherein a finger is moved rightward over the keyboard unit in order to select a desired item to be executed.

Referring to FIGS. 3 and 4, when a user intends to execute a command in the electronic device 100 according to the first embodiment of the present invention, the user uses a finger or a stylus 170 to touch a certain key 132. The touch sensing element 180 detects the touch of the finger or the stylus 170 and sends a responsive signal according to the touched key 132. The responsive signal is transmitted to a processor 150 inside the housing 110 and the processor 150 then shows a menu 160 on the display 120 according to the responsive signal. The menu 160 includes a plurality of items 162 corresponding to the symbol labeled on the touched key 132 and shown in a predetermined arrangement.

After the key 132 is touched and the corresponding items 162 are shown on the display 120, the user can move his finger 170 over the keyboard unit 130 in a manner corresponding to the arrangement of the items 162. Specifically, the user moves his finger 170 from the touched key 132 to a second key 132 without lifting his finger 170 from the keyboard unit 130. When the second key 132 is touched, the touch sensing element 180 below the keyboard unit 130 generates another responsive signal corresponding to the second key 132. The responsive signal is transmitted to the processor 150 and the processor 150 moves a selected frame 164 to a next item 162 in a manner corresponding to the movement of the finger 170 to mark the item 162. When the movement is continued, the selected frame 164 will also continue to move from item to item. When the movement is stopped, the selected frame 164 will stay on a certain item 162 to mark it. If the finger 170 is lifted from the keyboard unit 130 to terminate the touch, the processor 150 will execute a command associated with the marked item 162.

For example, when a user touches a key 132 labeled with "A", a menu 160 corresponding to the "A" is shown on the display 120. The menu 160 includes a plurality of items 162, such as items "a", "ä", "ã", "â", "á" and "à", which are arranged in a straight line from left to right in sequence. When the user moves his finger 170 rightward over the keyboard unit 130 to the key 130 labeled with "G", the selected frame 164 will move from the item "a", through the items "ä", "ã" and "â" in sequence, and finally to the item "à" accordingly. When the finger 170 is lifted from the keyboard unit 130 to terminate the touch on the key "G", the processor 150 will execute a command corresponding to the item "à", that is, to input the symbol "à" into the electronic device 100 and show it on an input area of the display 120.

Figure 5:
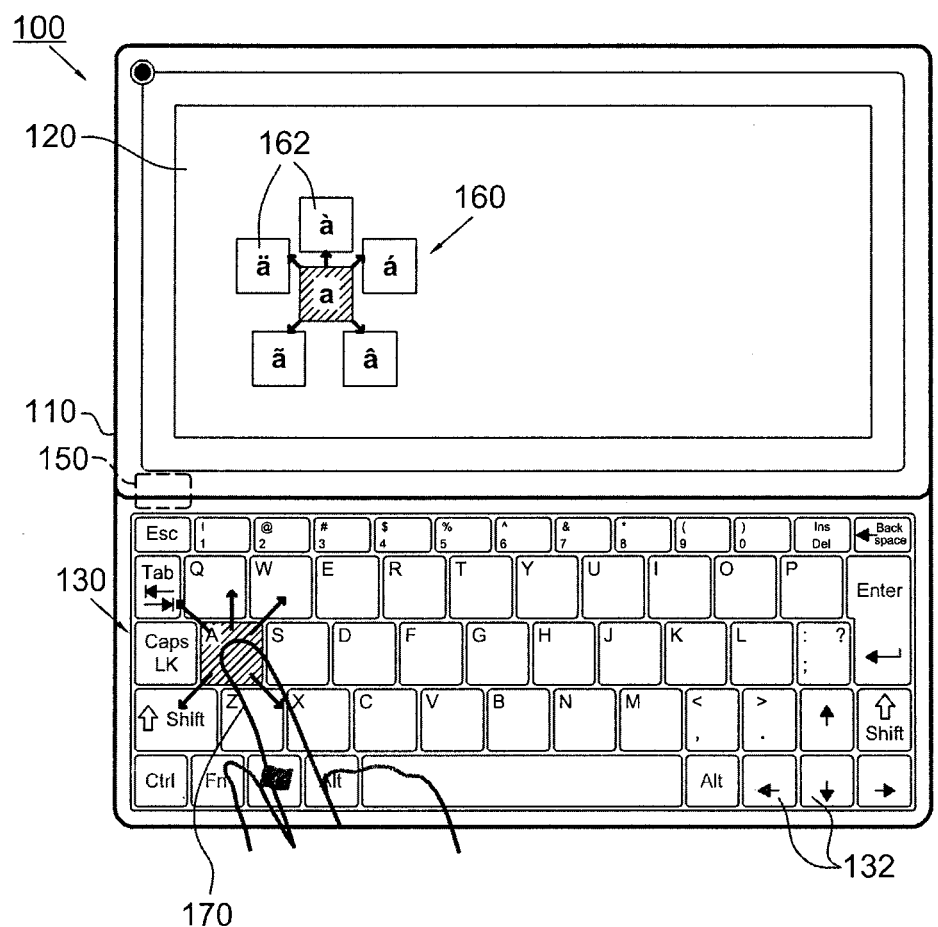
FIG. 5 illustrates the method for executing commands in the electronic device according to the first embodiment of the present invention, wherein a plurality of items is shown on the display in a radial arrangement.

The items 162 can be shown on the display 120 in other arrangements, e.g. in a radial arrangement or a circular arrangement, other than in a straight line arrangement. Referring to FIG. 5, when the items 162 are shown on the display 120 in a radial arrangement, one of the items 162 will be arranged in the center and the other items 162 will be arranged around the central item 162. When a user intends to select a certain one of the peripheral items 162 to execute its corresponding command, the user can move his finger 170 toward the position of the desired item 162 over the keyboard unit 130 to cause the selected frame 164 to move on the display 120 in a corresponding direction and then stop at the desired item 162. Finally, the finger 170 is lifted from the keyboard unit 130 to terminate the touch and then the processor 150 begins to execute a command associated with the marked item 162. When a user intends to execute a command corresponding to the central item 162, the user just needs to lift the finger 170 from the keyboard unit 130. For example, when the items "ä", "ã", "â", "á" and "à" are arranged around the item "a" and a user intends to select the item "â" to execute its corresponding command, the finger 170 is moved over the keyboard unit 130 in the lower right direction to cause the selected frame 164 to move and then stop at the item "â". Afterward, the finger 170 is lifted from the keyboard unit 130. When a user intends to execute a command corresponding to the central item "a", the user just needs to lift the finger 170 from the keyboard unit 130 without the need of moving the finger 170 over the keyboard unit 130.

Figure 6:
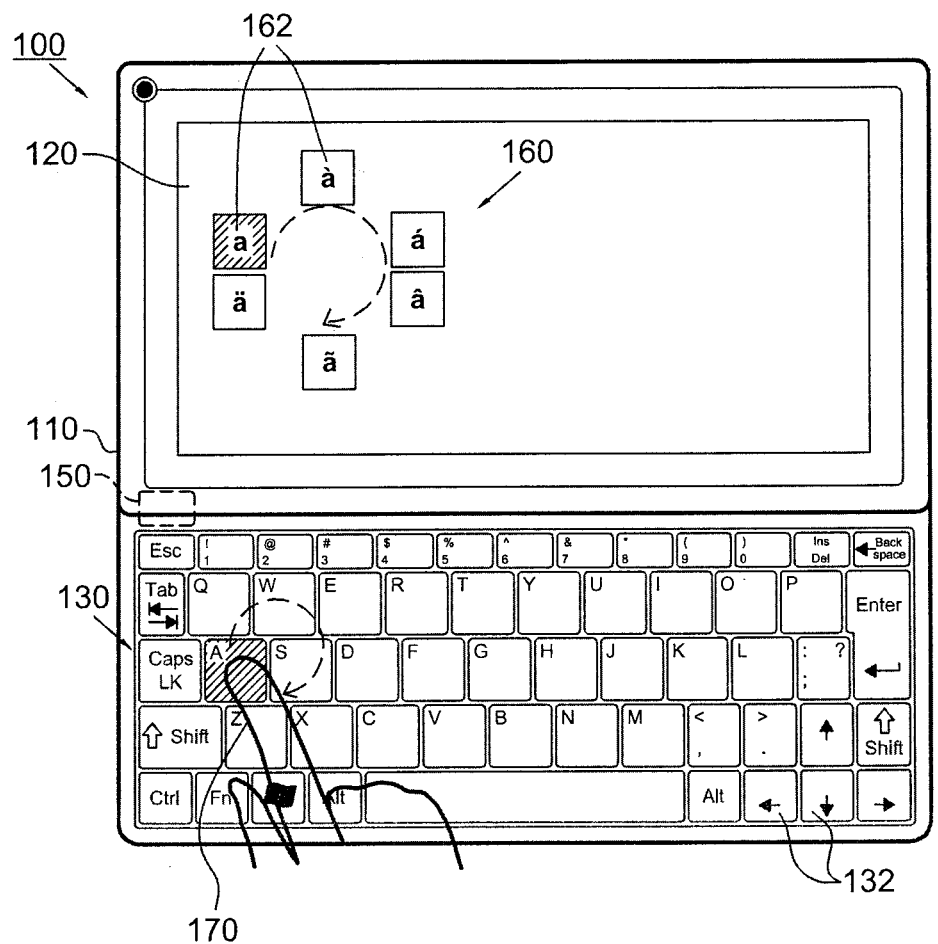
FIG. 6 illustrates the method for executing commands in the electronic device according to the first embodiment of the present invention, wherein a plurality of items is shown on the display in a circular arrangement.

Referring to FIG. 6, when items 162 are shown on the display 120 in a circular arrangement and a user intends to select a certain one of the items 162 to execute its corresponding command, the finger 170 is moved over the keyboard unit 130 in the clockwise or counterclockwise direction to cause the selected frame 164 to move on the display 120 in a corresponding direction and then stop at the desired item 162. Finally, the finger 170 is lifted from the keyboard unit 130 to terminate the touch and then the processor 150 begins to execute a command associated with the marked item 162. For example, when the items "ä", "ã", "â", "á" and "à" are arranged in a circle and a user intends to select the item "â" to execute its corresponding command, the finger 170 is moved over the keyboard unit 130 in the clockwise direction to cause the selected frame 164 to move and then stop at the item "â". Afterward, the finger 170 is lifted from the keyboard unit 130.

Figure 7:
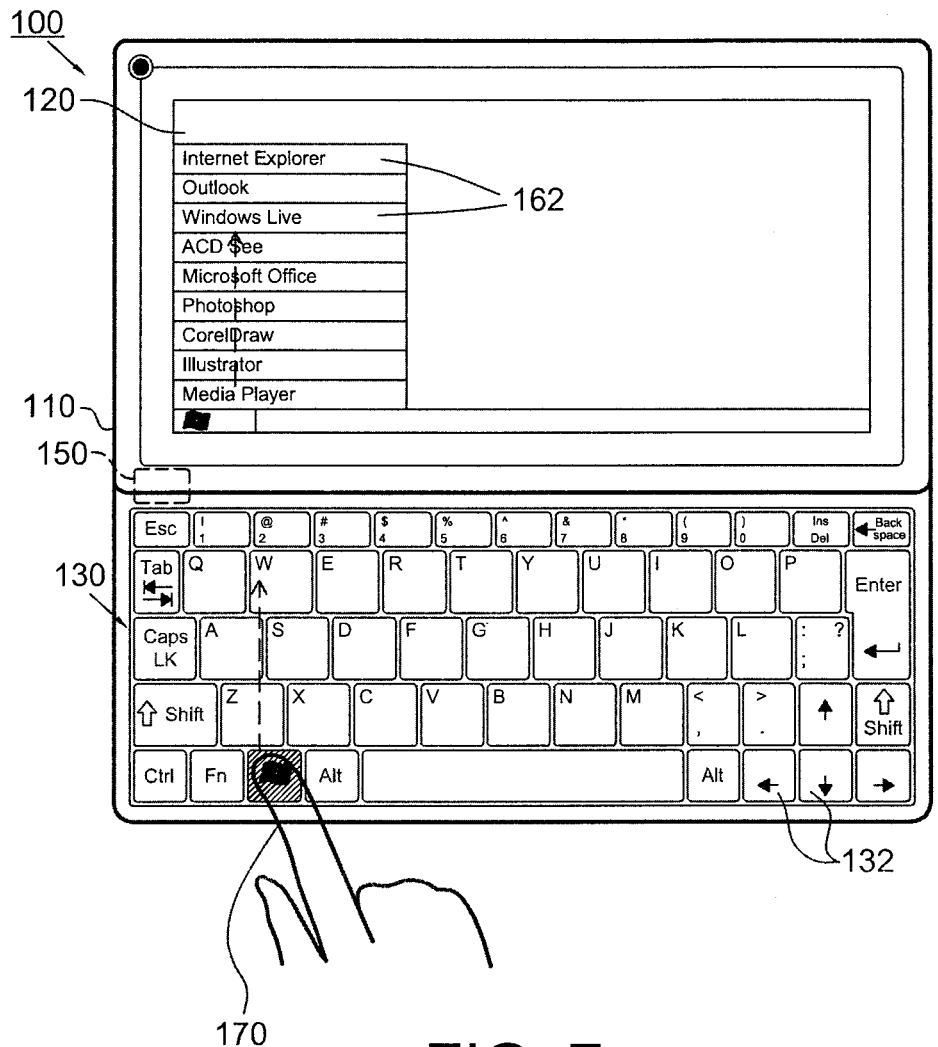
FIG. 7 illustrates the method for executing commands in the electronic device according to the first embodiment of the present invention, wherein a plurality of program items is shown on the display in a straight line arrangement.

The method for executing commands in an electronic device according to the present invention can be used to execute application programs other than to input symbols or texts. Referring to FIG. 7, when a finger 170 touches the key 132 labeled with a start symbol, several program items 162 will be shown on the display 120. Afterward, the finger 170 is moved upward over the keyboard unit 130 from the "start" key 132 to cause the selected frame 164 to move on the display 120 in a corresponding direction and then stop at the desired item 162. Finally, the finger 172 is lifted from the keyboard unit 130 to terminate the touch and then the processor 150 begins to execute an application program associated with the marked item 162.

Figure 8:
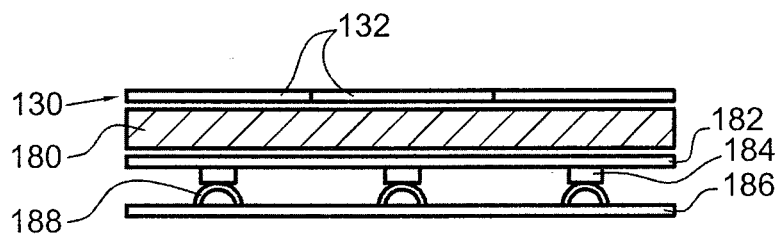
FIG. 8 is a partially cross-sectional view of the electronic device according to the second embodiment of the present invention.

Referring to FIG. 8, it illustrates a partially cross-sectional view of the electronic device according to the second embodiment of the present invention. In this embodiment, the touch sensing element 180 is preferably a capacitive touch sensor and a switch circuit board 186 is disposed under the touch sensing element 180. The switch circuit board 186 is provided with a plurality of switches 188 thereon and each switch 188 is positioned corresponding to one of the key 132 on the keyboard unit 130. A liner 182 is disposed between the touch sensing element 180 and switch circuit board 186. A plurality of protrusions 184 is disposed on the lower surface of the liner 182 and corresponding to the switches 188, respectively. When a certain key 132 is pressed, the corresponding protrusion 184 will be pressed down to cause the switch 188 corresponding to the pressed key 132 to establish an electrical connection thereby sending a signal to enable the touch sensing element 180.

The method for executing commands in the electronic device according to the second embodiment is substantially identical to that in the electronic device 100 according to the first embodiment. However, there are some differences between the above methods. In the second embodiment, when a certain key 132 is pressed, the switch 188 below the pressed key 132 will establish an electrical connection thereby sending a signal to enable the touch sensing element 180. The processor 150 then shows a corresponding menu 160 on the display 120 according to the signal. Other steps of the method in the second embodiment, including marking items 162 and executing commands associated with the marked items 162, are identical to the steps of the method described in the first embodiment. The details of the same steps can be referred to FIGS. 3 to 7 and any further illustrations about these steps are omitted herein.

According to the method for executing commands in an electronic device of the first embodiment of the present invention, a touch sensing element is used to detect a touch on one of the keys on the keyboard unit and generates a responsive signal corresponding to the touched key. Afterward, a plurality of items corresponding to the touched key is shown on a display according to the responsive signal. Subsequently, the touch on the key is moved onto another key on the keyboard unit so as to mark one of the items. Finally, a command associated with the marked item is executed when the touch on the key is terminated.

According to the method for executing commands in an electronic device of the second embodiment of the present invention, one of a plurality of switched is used to detect a press on a corresponding first key on the keyboard unit. Afterward, a plurality of items corresponding to the first key is shown on a display according to the press. Subsequently, a touch on the first key is detected by a touch sensing element. When the touch on the first key is moved onto a second key on the keyboard unit, one of the items is marked. Finally, a command associated with the marked item is executed when the touch on the second key is terminated.

According to the methods for executing commands in an electronic device, a desired command can be executed by only touching the keyboard unit and then performing a movement on the keyboard unit.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method of executing a command in an electronic device having a physical keyboard unit, a touch sensing element disposed under the physical keyboard unit, and a display, the method comprising:
   detecting a touch on a first key of the physical keyboard unit by the touch sensing element;
   showing a plurality of items corresponding to the first key on the display in response to the touch;
   when the touch is detected and moved from the first key to a second key of the physical keyboard unit, marking one of the items, wherein the touch is being moved outside the display on which the marked item is shown; and
   executing a command associated with the marked item when the touch is released from the second key, wherein
   a layout of the items corresponding to the first key is the same as a layout of the physical keyboard unit including at least the first key and the second key.

2. The method as claimed in claim 1, wherein the step of showing a plurality of items on the display comprises:
   showing the items on the display in a straight line arrangement.

3. The method as claimed in claim 1, wherein the step of showing a plurality of items on the display comprises:
   showing the items on the display in a radial arrangement.

4. The method as claimed in claim 1, wherein the step of showing a plurality of items on the display comprises:
   showing the items on the display in a circular arrangement.

5. The method of claim 1, wherein the physical keyboard unit is outside the display.

6. The method as claimed in claim 1, wherein the physical keyboard unit and the display are independent of each other.

7. A method of executing a command in an electronic device having a permanent keyboard unit, a touch sensing element disposed under the permanent keyboard unit, a plurality of switches disposed under the permanent keyboard unit, and a display, the method comprising:
   detecting a press on a first key of the permanent keyboard unit by a corresponding one of the switches;
   showing a plurality of items corresponding to the first key on the display in response to the press;
   when a touch is detected, by the touch sensing element, as being moved from the first key to a second key of the permanent keyboard unit, marking one of the items, wherein the touch is being moved outside the display on which the marked item is shown; and
   executing a command associated with the marked item when the touch is released from the second key, wherein
   a layout of the items corresponding to the first key is the same as a layout of the permanent keyboard unit including at least the first key and the second key.

8. The method as claimed in claim 7, wherein the step of showing a plurality of items on the display comprises:
   enabling the touch sensing element in response to the press.

9. The method as claimed in claim 7, wherein the step of showing a plurality of items on the display comprises:
   showing the items on the display in a straight line arrangement.

10. The method as claimed in claim 7, wherein the step of showing a plurality of items on the display comprises:
    showing the items on the display in a radial arrangement.

11. The method as claimed in claim 7, wherein the step of showing a plurality of items on the display comprises:
    showing the items on the display in a circular arrangement.

12. An electronic device, comprising:
    a permanent keyboard unit having at least a first key and a second key;
    a switch disposed under the permanent keyboard unit and configured for detecting a press on the first key;
    a touch sensing element disposed under the permanent keyboard unit and configured for detecting a touch on the first key when the switch detects the press;
    a display configured for showing a plurality of items corresponding to the first key in response to the press, and for marking one of the items in response to the touch moved over the permanent keyboard unit from the first key to the second key, wherein the permanent keyboard unit is outside the display on which the marked item is shown; and
    a processor configured for executing a command associated with the marked item when the touch is released from the second key, wherein
    a layout of the items corresponding to the first key is the same as a layout of the permanent keyboard unit including at least the first key and the second key.

13. The electronic device as claimed in claim 12, wherein the touch sensing element is a capacitive touch sensor.

14. The electronic device as claimed in claim 12, wherein the permanent keyboard unit is a QWERTY keyboard.

15. The electronic device as claimed in claim 12, wherein the permanent keyboard unit has a plurality of keys, and the keys, including the first key and the second key, are integrally formed on a same surface.

* * * * *